(12) United States Patent
Lin

(10) Patent No.: US 6,206,519 B1
(45) Date of Patent: Mar. 27, 2001

(54) EYEGLASSES ASSEMBLY INCLUDING A REMOVABLE AUXILIARY EYEGLASSES UNIT

(75) Inventor: Jey-Ching Lin, Taipei (TW)

(73) Assignee: Mao Lin Enterprise Co., Ltd., Taipei (TW)

( * ) Notice: Subject to any disclaimer, the term of this patent is extended or adjusted under 35 U.S.C. 154(b) by 0 days.

(21) Appl. No.: 09/567,875

(22) Filed: May 8, 2000

(51) Int. Cl.[7] .................................................. G02B 9/00
(52) U.S. Cl. .............................. 351/47; 381/48; 381/57; 381/58
(58) Field of Search ........................ 351/47, 48, 57, 351/58, 44, 45, 46, 41, 70, 124, 130

(56) References Cited

U.S. PATENT DOCUMENTS 5,907,384 * 5/1999 Kirsch et al. ........................ 351/48

* cited by examiner

Primary Examiner—Hung Xuan Dang
(74) Attorney, Agent, or Firm—Christie, Parker & Hale, LLP

(57) ABSTRACT

An eyeglasses assembly includes a main lens frame, a pair of primary lenses and an auxiliary eyeglasses unit. The main lens frame includes an adjacent pair of lens-holding rims, each of which has an inner rim portion adjacent to the other one of the lens-holding rims and formed with a rearwardly extending frame-retaining hook. The main lens frame further includes a bridge that interconnects the lens-holding rims and that is provided with a rearwardly extending stud. Each of the pair of primary lenses is mounted in a respective one of the lens-holding rims. The auxiliary eyeglasses unit includes an auxiliary lens frame that is generally inverted-U in shape and that has a pair of generally upright lens-holding arm portions and a connecting portion interconnecting upper ends of the lens-holding arm portions, and a pair of auxiliary lenses that are mounted respectively on the lens-holding arm portions. The auxiliary lens frame is mounted removably on the main lens frame such that each of the lens-holding arm portions engages a corresponding one of the frame-retaining hooks and such that the connecting portion engages the stud to dispose removably the auxiliary lenses behind the primary lenses, respectively.

9 Claims, 2 Drawing Sheets

EYEGLASSES ASSEMBLY INCLUDING A REMOVABLE AUXILIARY EYEGLASSES UNIT

BACKGROUND OF THE INVENTION

1. Field of the Invention

The invention relates to an eyeglasses assembly, more particularly to an eyeglasses assembly that includes a removable auxiliary eyeglasses unit.

2. Description of the Related Art

Eyeglasses, such as eyesight correcting eyeglasses or sun-shading eyeglasses, are currently in wide use. However, conventional eyeglasses only have one function, which is very inconvenient for users. For example, some people need eyesight correcting eyeglasses for vision correcting purposes. Because eyesight correcting eyeglasses are seldom capable of providing sun-shading functions, they are replaced by sun-shading eyeglasses when the user is outdoors. On the other hand, sun-shading eyeglasses generally lack vision correcting functions, thereby resulting in a great deal of inconvenience to users.

SUMMARY OF THE INVENTION

Therefore, the object of the present invention is to provide an eyeglasses assembly that includes a removable auxiliary eyeglasses unit to enable the eyeglasses assembly to possess both eyesight correcting and sun-shading functions in order to overcome the aforesaid drawback.

According to the present invention, an eyeglasses assembly includes a main lens frame, a pair of primary lenses and an auxiliary eyeglasses unit. The main lens frame includes an adjacent pair of lens-holding rims, each of which has an inner rim portion adjacent to the other one of the lens-holding rims and formed with a rearwardly extending frame-retaining hook. The main lens frame further includes a bridge that interconnects the lens-holding rims and that is provided with a rearwardly extending stud. Each of the pair of primary lenses is mounted in a respective one of the lens-holding rims. The auxiliary eyeglasses unit includes an auxiliary lens frame that is generally inverted-U in shape and that has a pair of generally upright lens-holding arm portions and a connecting portion interconnecting upper ends of the lens-holding arm portions, and a pair of auxiliary lenses that are mounted respectively on the lens-holding arm portions. The auxiliary lens frame is mounted removably on the main lens frame such that each of the lens-holding arm portions engages a corresponding one of the frame-retaining hooks and such that the connecting portion engages the stud to dispose removably the auxiliary lenses behind the primary lenses, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
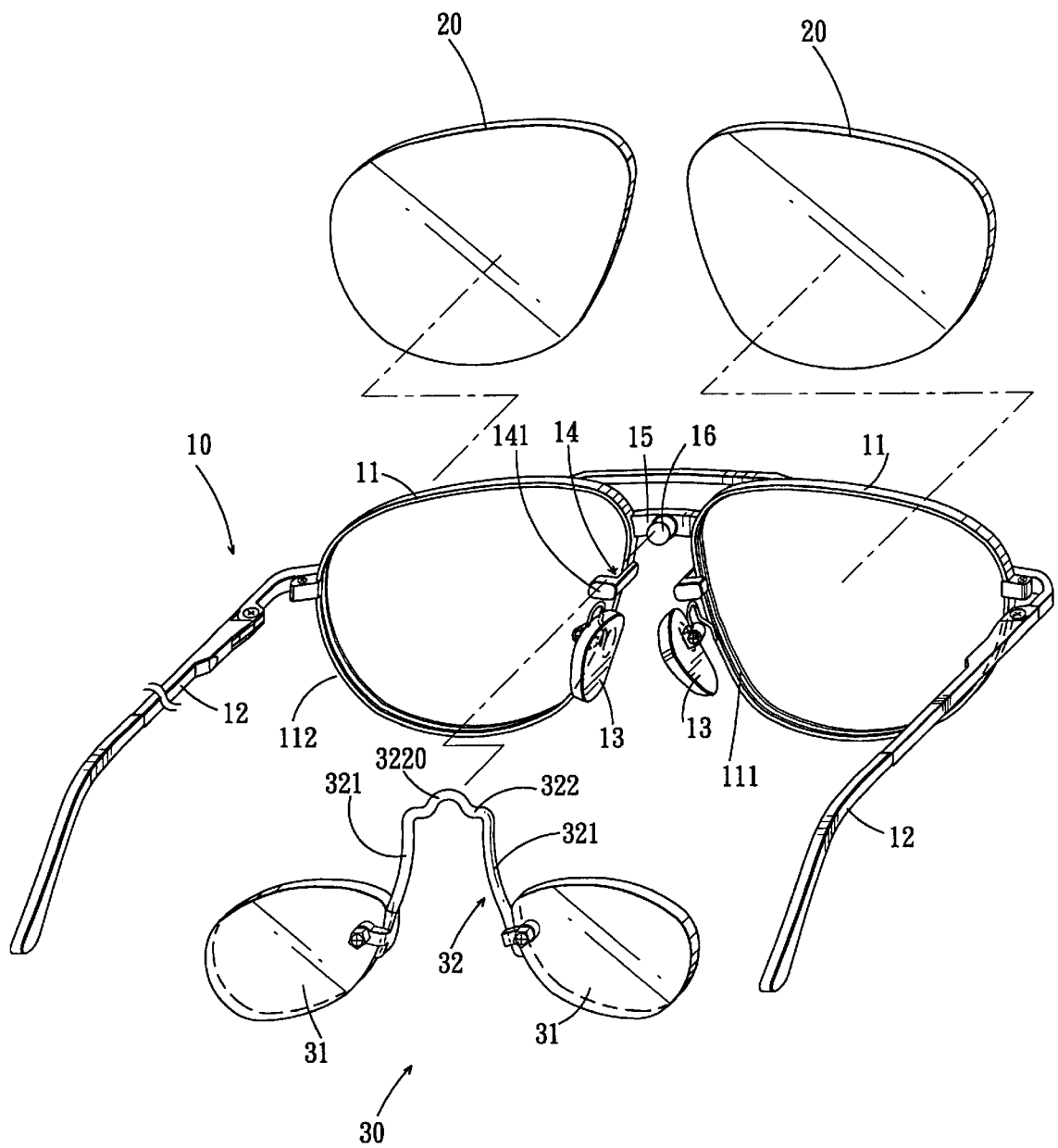
FIG. 1 is an exploded perspective view of the preferred embodiment of an eyeglasses assembly according to the present invention.

Referring to FIG. 1, the preferred embodiment of an eyeglasses assembly according to the present invention is shown to comprise a main lens frame 10, a pair of primary lenses 20 and an auxiliary eyeglasses unit 30.

The main lens frame 10 includes an adjacent pair of lens-holding rims 11, each of which has inner and outer rim portions 111, 112. The inner rim portion 111 is disposed adjacent to the other one of the lens-holding rims 11, and is formed with a rearwardly extending frame-retaining hook 14 having a bent distal end 141 that extends away from the other one of the lens-holding rims 11 and that defines an arm-receiving notch 142 (see FIG. 2). The inner rim portion 111 further has a nose pad 13 mounted below the frame-retaining hook 14. A temple 12 is mounted pivotally on the outer rim portion 112 of each lens-holding rim 11. The main lens frame 10 further has a bridge 15 that interconnects the lens-holding rims 11 and that is provided with a rearwardly extending stud 16.

Each of the primary lenses 20, which can be planar lenses or sunshade lenses, is mounted in a respective one of the lens-holding rims 11.

The auxiliary eyeglasses unit 30 includes an auxiliary lens frame 32 and a pair of auxiliary lenses 31. The auxiliary lens frame 32 is generally inverted-U in shape, and includes a pair of generally upright lens-holding arm portions 321 and a connecting portion 322 which has an upwardly extending arched section 3220 and which interconnects upper ends of the lens-holding arm portions 321. The pair of auxiliary lenses 31, which can be eyesight correcting lenses, are mounted respectively on the lens-holding arm portions 321.

Figure 2:
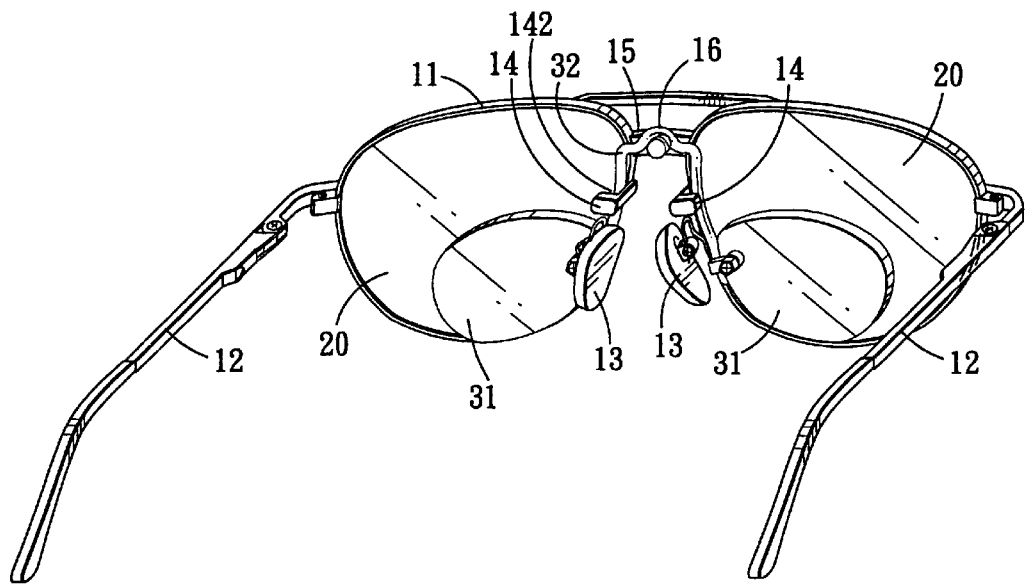
FIG. 2 is an assembled rear perspective view of the preferred embodiment.
Figure 3:
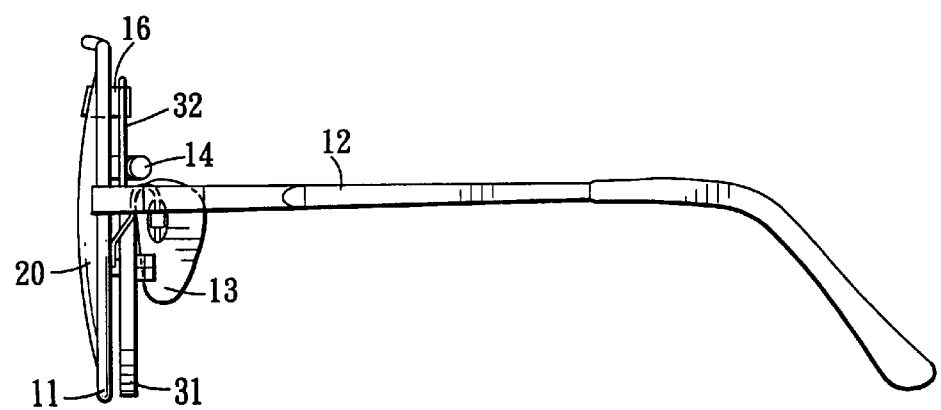
FIG. 3 is a schematic side view of the preferred embodiment.

With further reference to FIGS. 2 and 3, the auxiliary lens frame 30 is mounted removably on the main lens frame 10 such that each of the lens-holding arm portions 321 of the auxiliary lens frame 32 engages the frame-retaining hook 14 on the inner rim portion 111 of a corresponding one of the lens-holding rims 11 via retention in the arm-receiving notch 142, and such that the upwardly extending arched section 3220 of the connecting portion 322 engages the stud 16 on the bridge 15 of the main lens frame 10 to dispose removably the auxiliary lenses 31 behind the primary lenses 20, respectively.

Preferably, the auxiliary lens frame 32 is made of a magnetically attractive material, and the stud 16 on the bridge 15 is made of a magnetic material to establish magnetic attraction between the auxiliary lens frame 32 and the stud 16.

In view of the above-described construction, the auxiliary eyeglasses unit 30 could be attached to the main lens frame 10 so that the functions attributed to the primary and auxiliary lenses 20, 31 are available to the user, and could be removed from the main lens frame 10 when the function attributed to the auxiliary lenses 31 is unnecessary.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An eyeglasses assembly comprising:

a main lens frame including an adjacent pair of lens-holding rims, each of which has an inner rim portion adjacent to the other one of said lens-holding rims and formed with a rearwardly extending frame-retaining hook, said main lens frame further including a bridge that interconnects said lens-holding rims and that is provided with a rearwardly extending stud;

a pair of primary lenses, each of which is mounted in a respective one of said lens-holding rims; and an auxiliary eyeglasses unit including an auxiliary lens frame that is generally inverted-U in shape and that includes a pair of generally upright lens-holding arm portions and a connecting portion interconnecting upper ends of said lens-holding arm portions, and a pair of auxiliary lenses that are mounted respectively on said lens-holding arm portions;

said auxiliary lens frame being mounted removably on said main lens frame such that each of said lens-holding arm portions engages a corresponding one of said frame-retaining hooks and such that said connecting portion engages said stud to dispose removably said auxiliary lenses behind said primary lenses, respectively.

2. The eyeglasses assembly of claim 1, wherein each of said frame-retaining hooks has a bent distal end that extends away from the other one of said lens-holding rims and that defines an arm-receiving notch to retain the corresponding one of said lens-holding arm portions therein.

3. The eyeglasses assembly of claim 1, wherein said connecting portion has an upwardly extending arched section for engaging said stud.

4. The eyeglasses assembly of claim 1, wherein said inner rim portion of each of said lens-holding rims further has a nose pad mounted thereon, each of said frame-retaining hooks being disposed on said inner rim portion between said bridge and said nose pad.

5. The eyeglasses assembly of claim 1, wherein each of said lens-holding rims further has an outer rim portion with a temple mounted pivotally thereon.

6. The eyeglasses assembly of claim 1, wherein each of said primary lenses is a planar lens.

7. The eyeglasses assembly of claim 1, wherein each of said primary lenses is a sunshade lens.

8. The eyeglasses assembly of claim 1, wherein each of said auxiliary lenses is an eyesight correcting lens.

9. The eyeglasses assembly of claim 1, wherein said auxiliary lens frame is made of a magnetically attractive material, and said stud is made of a magnetic material to establish magnetic attraction between said auxiliary lens frame and said stud.

* * * * *